(12) United States Patent
Lin et al.

(10) Patent No.: US 11,546,002 B2
(45) Date of Patent: Jan. 3, 2023

(54) TRANSMITTER, RECEIVER AND TRANSCEIVER

(71) Applicant: REALTEK SEMICONDUCTOR CORPORATION, Hsinchu (TW)

(72) Inventors: Jian-Ru Lin, Nantou County (TW); Wei-Chou Wang, Hsinchu County (TW); Tung-Hung Sung, Kaohsiung (TW); Shih-Hsiung Huang, Miaoli County (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 16/843,438

(22) Filed: Apr. 8, 2020

(65) Prior Publication Data
US 2020/0328761 A1    Oct. 15, 2020

(30) Foreign Application Priority Data
Apr. 9, 2019  (TW) .................................. 108112296

(51) Int. Cl.
*H04L 25/28*    (2006.01)
*H04B 1/00*    (2006.01)
(Continued)

(52) U.S. Cl.
CPC ........... *H04B 1/001* (2013.01); *H04B 1/0458* (2013.01); *H04L 25/028* (2013.01); *H04L 25/0276* (2013.01)

(58) Field of Classification Search
CPC ..................................................... H04L 12/28
(Continued)

(56) References Cited

U.S. PATENT DOCUMENTS 6,424,234 B1 *  7/2002  Stevenson ............ A61N 1/3752
                                                     333/182
6,617,888 B2    9/2003  Volk
(Continued)

FOREIGN PATENT DOCUMENTS

CN    101447785 A    6/2009
CN    102428653 A    4/2012
(Continued)

OTHER PUBLICATIONS

Taiwan Intellectual Property Office, Office Action letter of the counterpart TW application (appl. No. 108112296) dated Jul. 31, 2019. English summary of the OA letter(dated Jul. 31, 2019) on p. 1.

(Continued)

*Primary Examiner* — Dang T Ton
(74) *Attorney, Agent, or Firm* — WPAT, PC

(57) ABSTRACT

A transmitter, a receiver and a transceiver are provided. The transceiver includes a hybrid transceiving circuit and a common-mode voltage control circuit. The hybrid transceiving circuit includes a digital-to-analog converter (DAC) circuit, a line driver coupled to the DAC circuit, a filtering and/or amplifying circuit coupled to the line driver, and an analog-to-digital converter (ADC) circuit coupled to the filtering and/or amplifying circuit. The common-mode voltage control circuit is electrically connected to a node of the hybrid transceiving circuit and is configured to detect a common-mode voltage of the node and to adjust the common-mode voltage of the node.

17 Claims, 6 Drawing Sheets

(51) Int. Cl.
*H04B 1/04* (2006.01)
*H04L 25/02* (2006.01)

(58) Field of Classification Search
USPC .......................................................... 370/329
See application file for complete search history.

(56) References Cited

U.S. PATENT DOCUMENTS

| | | | |
|---|---|---|---|
| 8,310,387 | B2 | 11/2012 | Harris et al. |
| 8,442,099 | B1 | 5/2013 | Sederat |
| 10,075,174 | B1 | 9/2018 | Bucossi et al. |
| 2008/0012642 | A1 | 1/2008 | Cranford et al. |
| 2009/0270054 | A1 | 10/2009 | Ridgers et al. |
| 2010/0301936 | A1 | 12/2010 | Lipka |
| 2011/0019760 | A1 | 1/2011 | Nguyen |
| 2011/0296267 | A1 | 12/2011 | Malkin et al. |
| 2014/0079106 | A1 | 3/2014 | Thelen et al. |
| 2018/0131353 | A1 | 5/2018 | Lin |
| 2019/0069087 | A1 | 2/2019 | Risbo |
| 2020/0089354 | A1* | 3/2020 | Gray ..................... G06F 3/0412 |

FOREIGN PATENT DOCUMENTS

| | | |
|---|---|---|
| CN | 102916698 A | 2/2013 |
| CN | 103684488 A | 3/2014 |
| TW | I279981 B | 4/2007 |
| TW | I482449 B | 4/2015 |

OTHER PUBLICATIONS

Taiwan Intellectual Property Office, Office Action letter of the counterpart TW application (appl. No. 108112296) dated Oct. 28, 2019. English summary of the OA letter(dated Oct. 28, 2019) on p. 1.

T. Gupta et al., "A sub-2W 10GBase-T analog front-end in 40nm CMOS process," 2012 IEEE International Solid-State Circuits Conference, San Francisco, CA, 2012, pp. 410-412.

W. Yang et al., "A 3-V 340 mW14-b 75 Msample/s CMOS ADC with 85-dB SFDR at Nyquist input," IEEE J. Solid-State Circuits, vol. 36, pp. 1931-1936, Dec. 2001.

OA letter of the counterpart TW application (appl. No. 108112296) dated Dec. 29, 2020. Summary of the OA letter: (1) Claims 1, 4-6, and 9-10 are rejected under Patent Law Article 22(2) as being unpatentable over reference 3 (U.S. Pat. No. 8,442,099 B1) and reference 4 (U.S. 2014/0079106 (A1). (2) Claims 2-3 are rejected under Patent Law Article 22(2) as being unpatentable ever reference 3 (U.S. Pat. No. 8,442,099 B1), reference 4 (U.S. 2014/0079106 A1) and reference 5 (U.S. 2011/0019760 A1). (3) Claims 7 is rejected under Patent Law Article 22(2) as being unpatentable over reference 3 (U.S. Pat. No. 8,442,099 B1), reference 4 (U.S. 2014/0079106 A1) and reference 6 (U.S. 2011/0296267 A1). (4) Claims 8 is rejected under Patent Law Article 22(2) as being unpatentable over reference 3 (U.S. Pat. No. 8,442,099 B1), reference 4 (U.S. 2014/0079106 A1) and reference 7 (U.S. 2009/0270054 A1).

OA letter of the counterpart TW application (appl. No. 108112296) mailed on May 10, 2021.Summary of the OA letter: (1) Claims 1, 3-6, 9 are rejected under Patent Law Article 22(2) as being unpatentable over reference 3 (U.S. Pat. No. 8,442,099 B1) and reference 4 (US 2014/0079106 A1). (2) Claim 7 are rejected under Patent Law Article 22(2) as being unpatentable aver reference 3, reference 4, and reference 6 (US 2011/0296267 A1).(3) Claim 8 are rejected under Patent Law Article 22(2) as being unpatentable over reference 3, reference 4, and reference 7 (US 2009/0270054 A1).

OA letter of the counterpart CN application(appl. No. 202010269369. 8) mailed on Jun. 18, 2021. Summary of the OA letter: (1) Claims 1 and 4-8 are unpatentable over CN103684488A, CN101447785A, and CN102428653A. (2) Claim 9 is unpatentable over CN101447785A and US2007273444A1. (3) Claim 10 is unpatentable over CN103684488A, CN102428653A, and CN102916698A.

OA letter of the counterpart TW application (appl. No. 108112296) mailed on Sep. 6, 2021. Summary of the OA letter: (1) Claim(s) 1, 5 and 8-10 is/are rejected under Patent Law Article 22(2) as being unpatentable over reference 3 (U.S. Pat. No. 8,442,099 B1), reference 8 (US 2019/0069087 A1) and reference 9 (US 2010/0301936 A1). Claim(s) 2 is/are rejected under Patent Law Article 22(2) as being unpatentable over reference 3, reference 8, reference 9 and reference 10 (U.S. Pat. No. 10,075,174 B1). Claim(s) 3 is/are rejected under Patent Law Article 22(2) as being unpatentable over reference 3, reference 8, reference 9 and reference 11 (US 2008/0012642 A1). Claim(s) 4 and 6 is/are rejected under Patent Law Article 22(2) as being unpatentable over reference 3, reference 4 (US 2014/0079106 A1), reference 8 and reference 9. Claim(s) 7 is/are reiected under Patent Law Article 22(2) as being unpatentable over reference 3, reference 6 (US 2011/0296267 A1), reference 8 and reference 9.

\* cited by examiner

TRANSMITTER, RECEIVER AND TRANSCEIVER

BACKGROUND OF THE INVENTION

1. Field of the Invention

The present invention generally relates to receivers, transmitters and transceivers of electronic devices, and, more particularly, to common-mode voltage control of receivers, transmitters, and transceivers.

2. Description of Related Art

An electronic device with a connection capability includes a transmitter and a receiver, or a transceiver, which is an integration of a transmitter and a receiver. The transmitter tends to disturb the common-mode voltage on the circuit when transmitting differential signals. As to the receiver, when receiving the differential signals, the receiver is also subject to the input signals, leading to disturbance on the common-mode voltage on the circuit. In other words, the disturbance on the common-mode voltage of the transmitter, receiver and transceiver of the electronic device may arise from the inside of the circuits or the input signals. The disturbance on the common-mode voltage may cause poor signal-to-noise-and-distortion ratio (SNDR), the occurrence of electromagnetic interference (EMI) or insufficient voltage headroom. Insufficient voltage headroom may decrease the linearity of the circuit.

Therefore, it is necessary to address the above issues to improve the performance and accuracy of transmitters, receivers, and transceivers.

SUMMARY OF THE INVENTION

In view of the issues of the prior art, an object of the present invention is to provide a transmitter, a receiver and a transceiver to improve the performance and accuracy of transmitters, receivers and transceivers.

A transceiver is provided. The transceiver includes a hybrid transceiving circuit and a common-mode voltage control circuit. The hybrid transceiving circuit includes a digital-to-analog converter circuit, a line driver coupled to the digital-to-analog converter circuit, a filtering and/or amplifying circuit coupled to the line driver, and an analog-to-digital converter circuit coupled to the filtering and/or amplifying circuit. The common-mode voltage control circuit is electrically connected to a node of the hybrid transceiving circuit and configured to detect a common-mode voltage of the node and to adjust the common-mode voltage of the node.

A transmitter is also provided. The transmitter includes a transmitting circuit and a common-mode voltage control circuit. The transmitting circuit includes a digital-to-analog converter circuit, a line driver coupled to the digital-to-analog converter circuit, and a terminator coupled to the line driver. The common-mode voltage control circuit is electrically connected to a node of the transmitting circuit and configured to detect a common-mode voltage of the node and to adjust the common-mode voltage of the node.

A receiver is also provided. The receiver includes a receiving circuit and a common-mode voltage control circuit. The receiving circuit includes a terminator, a filtering and/or amplifying circuit coupled to the terminator, and an analog-to-digital converter circuit coupled to the filtering and/or amplifying circuit. The common-mode voltage control circuit is electrically connected to a node of the receiving circuit and configured to detect a common-mode voltage of the node and to adjust the common-mode voltage of the node.

The transmitter, receiver and transceiver of the present invention include a common-mode voltage control circuit which can stabilize the common-mode voltage of a certain circuit node of the transmitter, receiver and transceiver. Compared with the conventional technology, the common-mode voltage of the transmitter, receiver and transceiver of the present invention is less susceptible to disturbance and appears relatively stable, and so the performance of the transmitter, receiver and transceiver is improved.

These and other objectives of the present invention no doubt become obvious to those of ordinary skill in the art after reading the following detailed description of the preferred embodiments with reference to the various figures and drawings.

DETAILED DESCRIPTION OF THE EMBODIMENTS

The following description is written by referring to terms of this technical field. If any term is defined in this specification, such term should be explained accordingly. In addition, the connection between objects or events in the below-described embodiments can be direct or indirect provided that these embodiments are practicable under such connection. Said "indirect" means that an intermediate object or a physical space exists between the objects, or an intermediate event or a time interval exists between the events.

The disclosure herein includes a transmitter, receiver and transceiver. On account of that some or all elements of the transmitter, receiver and transceiver could be known, the detail of such elements is omitted provided that such detail has little to do with the features of this disclosure, and that this omission nowhere dissatisfies the specification and enablement requirements.

Figure 1A:
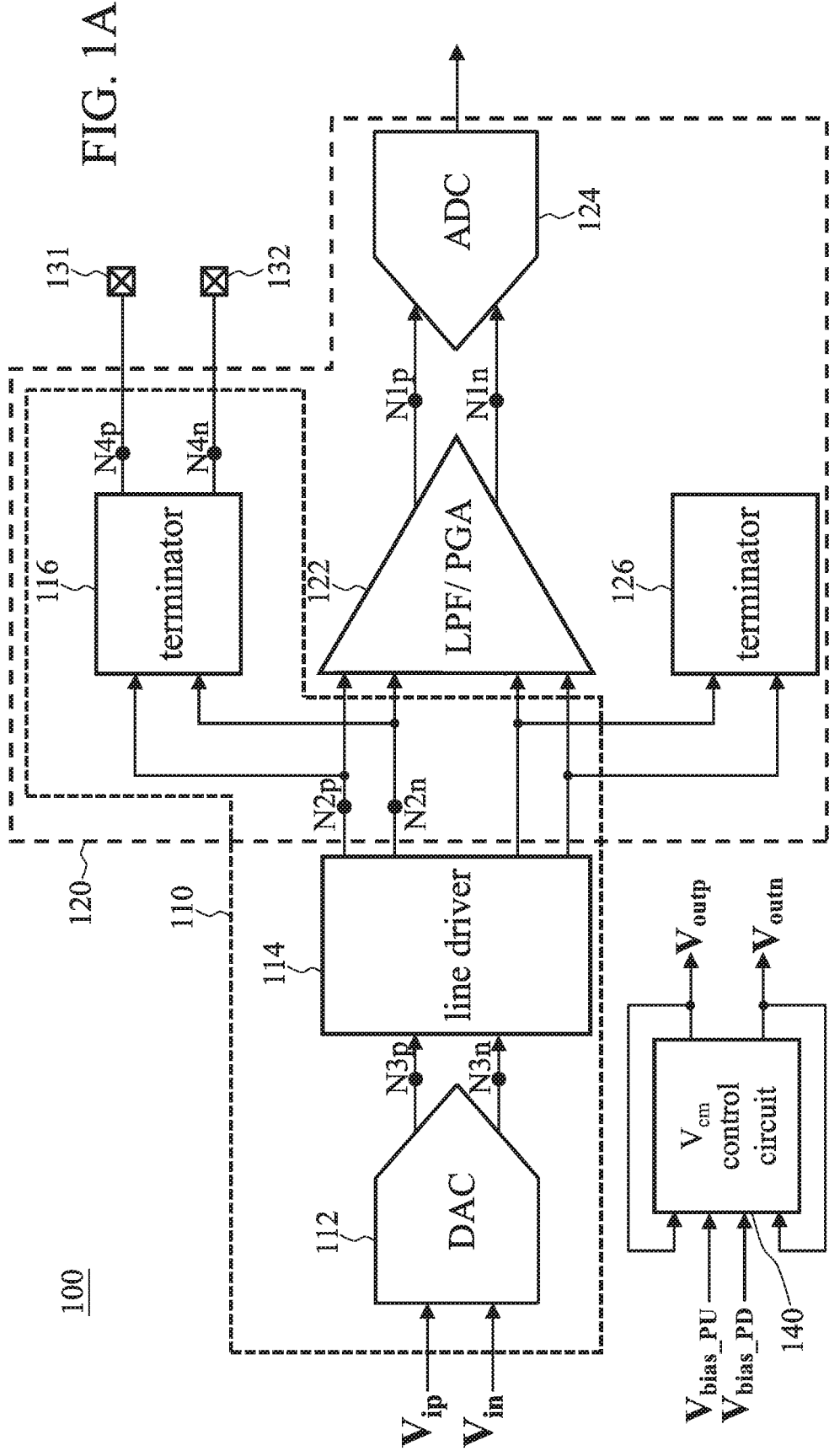
FIG. 1A illustrates a functional block diagram of a transceiver according to an embodiment of the present invention.

FIG. 1A is a functional block diagram of a transceiver according to an embodiment of the present invention. The transceiver 100 includes a hybrid transceiving circuit and a common-mode voltage ($V_{cm}$) control circuit 140. The hybrid transceiving circuit includes a transmitting circuit 110 and a receiving circuit 120. The transmitting circuit 110 and the common-mode voltage control circuit 140 constitute a transmitting section of the transceiver 100. The receiving circuit 120 and the common-mode voltage control circuit 140 constitute a receiving section of the transceiver 100. The transmitting circuit 110 and the receiving circuit 120 share the pin 131 and the pin 132. The transceiver 100 is coupled to an external circuit through the pins 131 and 132 (i.e., the pins 131 and 132 are output/input terminals of the transceiver 100). For example, when the transceiver 100 is applied to Ethernet, the pins 131 and 132 are coupled to the RJ45 connector through a transformer. The transmitting circuit 110 outputs signals through the pins 131 and 132 (i.e., the pins 131 and 132 are the output terminals of the transmitting circuit 110), and the receiving circuit 120 receives signals through the pins 131 and 132 (i.e., the pins 131 and 132 are the input terminals of the receiving circuit 120).

The transmitting circuit 110 includes a digital-to-analog converter (DAC) circuit 112, a line driver 114 and a terminator 116. The DAC circuit 112 receives signals Vin and Vip from a pre-stage circuit (e.g., a digital signal processor (DSP), not shown) and converts the signals Vin and Vip into analog signals. The line driver 114 is used for enhancing the driving capability of the output signals. The terminator 116 is used for impedance matching. The line driver 114 may further include an echo canceller. However, in cases where the line driver 114 is employed in a transmitter rather than a transceiver, the line driver 114 does not include an echo canceller. The internal circuits of the DAC circuit 112, line driver 114 and terminator 116 are well known to those having ordinary skill in the art, and are thus omitted for brevity. In some embodiments, the terminator 116 is integrated into the line driver 114; in this instance, the output of the line driver 114 is electrically connected to the pins 131 and 132.

Figure 1B:
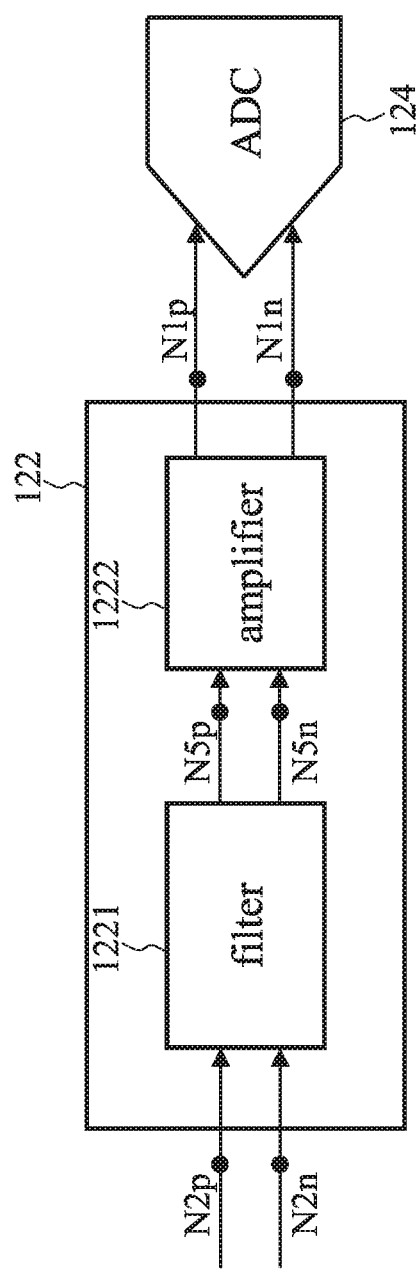
FIG. 1B illustrates a functional block diagram of the filtering and/or amplifying circuit 122 in FIG. 1A according to an embodiment of the present invention.

The receiving circuit 120 includes a filtering and/or amplifying circuit 122, an analog-to-digital converter (ADC) circuit 124, a terminator 116 and a terminator 126. The receiving circuit 120 receives the input signal through the pins 131 and 132. The filtering and/or amplifying circuit 122 filters and/or amplifies the input signal, and the ADC circuit 124 converts the filtered and/or amplified input signal into a digital signal before sending it to another circuit (e.g., sending the digital signal to a digital signal processor (DSP)). In some embodiments, the filtering and/or amplifying circuit 122 may be implemented by (1) an amplifier having a filtering capability (such as a programmable gain amplifier (PGA)); (2) a filter (such as a low-pass filter (LPF)); or (3) a filter 1221 and an amplifier 1222 which are connected in series, as shown in FIG. 1B. In the event of FIG. 1B, the input signal passes through the filter 1221 and then the amplifier 1222 before entering the ADC circuit 124. The terminator 126 provides impedance matching on the echo-canceling path. The internal circuits of the filtering and/or amplifying circuit 122, the ADC circuit 124 and the terminator 126 are well known to those having ordinary skill in the art, and are thus omitted for brevity.

The common-mode voltage control circuit 140 is used for detecting and adjusting a common-mode voltage of a node in the transmitting circuit 110 and/or the receiving circuit 120. More specifically, the transmitting circuit 110 and the receiving circuit 120 include multiple nodes Nxp and Nxn (in the example circuit of FIG. 1A, 1≤x≤4), and the common-mode voltage control circuit 140 is electrically connected to any of these nodes and adjusts the common-mode voltage of the connected/controlled node according to the common-mode voltage of the differential signal on the connected/controlled node. In other words, the common-mode voltage control circuit 140 is a closed-loop control circuit. As shown in FIG. 1A, the common-mode voltage control circuit 140 uses the voltage $V_{bias\_PU}$ and the voltage $V_{bias\_PD}$ as the bias voltages and uses the output signal $V_{outp}$ and the output signal $V_{outn}$ as its own feedback signals. The output signals $V_{outp}$ and $V_{outn}$ are the differential signal on the nodes Nxp and Nxn. In other words, the common-mode voltage control circuit 140 may be electrically connected to: (1) the input terminals of the ADC circuit 124 (corresponding to the node (N1p, N1n)); (2) the output terminals of the filtering and/or amplifying circuit 122 (corresponding to the node (N1p, N1n)); (3) the input terminals of the filtering and/or amplifying circuit 122 (corresponding to the node (N2p, N2n)); (4) the output terminals of the line driver 114 (corresponding to the node (N2p, N2n)); (5) the input terminals of the terminator 116 (corresponding to the node (N2p, N2n)); (6) the output terminals of the DAC circuit 112 (corresponding to the node (N3p, N3n)); (7) the input terminals of the line driver 114 (corresponding to the node (N3p, N3n)); (8) the output terminals of the terminator 116 (corresponding to the node (N4p, N4n)); or (9) the pins 131 and 132 (corresponding to the node (N4p, N4n)).

In practice, the common-mode voltage control circuit 140 may also be electrically connected to nodes other than the above-mentioned nodes, including but not limited to the node (N5p, N5n) between the filter 1221 and the amplifier 1222 as shown in FIG. 1B. In some embodiments, the transceiver 100 may include multiple common-mode voltage control circuits 140 to simultaneously stabilize the common-mode voltages of multiple nodes in the circuit.

Figure 2:
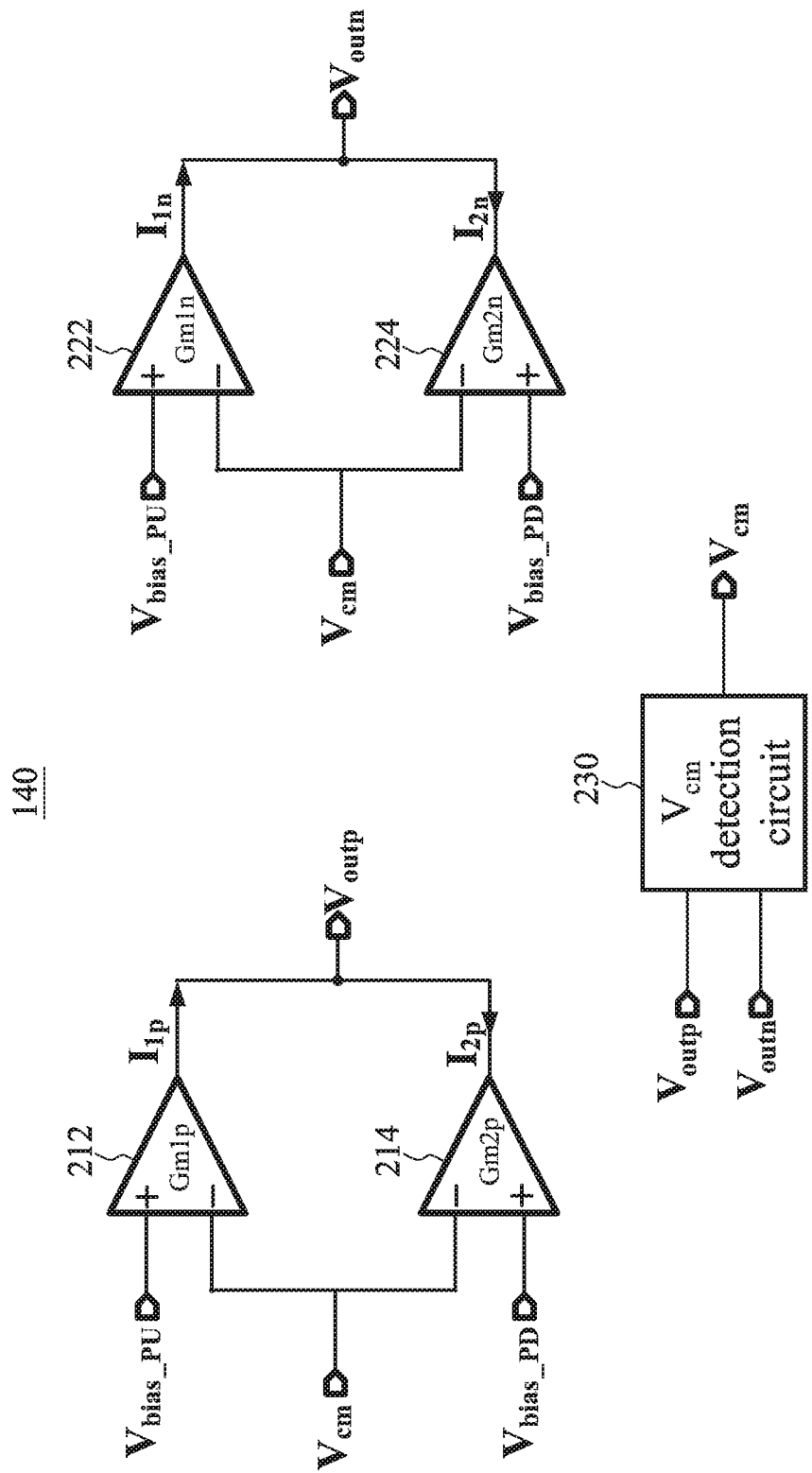
FIG. 2 illustrates a functional block diagram of a common-mode voltage control circuit according to an embodiment of the present invention.

FIG. 2 is a functional block diagram of the common-mode voltage control circuit 140 according to an embodiment of the present invention. The common-mode voltage control circuit 140 includes a pull-up circuit 212, a pull-down circuit 214, a pull-up circuit 222, a pull-down circuit 224 and a common-mode voltage ($V_{cm}$) detection circuit 230. The pull-up circuit 212 and the pull-up circuit 222 are biased by the voltage $V_{bias\_PU}$, and the pull-down circuit 214 and the pull-down circuit 224 are biased by the voltage $V_{bias\_PD}$. The common-mode voltage detection circuit 230 detects a common-mode voltage $V_{cm}$ of the output signal $V_{outp}$ and the output signal $V_{outn}$, that is, the common-mode voltage detection circuit 230 generates the common-mode voltage $V_{cm}$ according to the output signal $V_{outp}$ and the output signal $V_{outn}$. The pull-up circuit 212 (222) sources the current $I_{1p}$ ($I_{1n}$) to the node Nxp (Nxn), whereas the pull-down circuit 214 (224) sinks the current $I_{2p}$ ($I_{2n}$) from the node Nxp (Nxn). More specifically, the pull-up circuit 212, pull-down circuit 214, pull-up circuit 222 and pull-down circuit 224 adjust the current $I_{1p}$, current $I_{2p}$, current $I_{1n}$ and current $I_{2n}$, respectively, according to the common-mode voltage $V_{cm}$ in the following manner (1) when the common-mode voltage $V_{cm}$ increases, the pull-up circuit 212 (222) decreases the current $I_{1p}$ ($I_{1n}$) (i.e., decreasing the pull-up strength), and the pull-down circuit 214 (224) increases the current $I_{2p}$ ($I_{2n}$) (i.e., increasing the pull-down strength), so as to decrease the voltages of the output signal $V_{outp}$ and the output signal $V_{outn}$ (i.e., decreasing the common-mode voltage $V_{cm}$); and (2) when the common-mode voltage $V_{cm}$ decreases, the pull-up circuit 212 (222) increases the current $I_{1p}$ ($I_{1n}$) (i.e., increasing the pull-up strength), and the pull-down circuit 214 (224) decreases the current $I_{2p}$ ($I_{2n}$) (i.e., decreasing the pull-down strength), so as to increase the voltages of the output signal $V_{outp}$ and the output signal $V_{outn}$ (i.e., increasing the common-mode voltage $V_{cm}$). That is to say, the common-mode voltage control circuit 140 detects the common-mode voltage $V_{cm}$ of the controlled node (i.e., Nxp and Nxn) and stabilizes the common-mode voltage $V_{cm}$ of the controlled node by adjusting the currents flowing into and out of the controlled node. When the common-mode voltage $V_{cm}$ is close to a preset range, $I_{1p}$ is substantially equal to $I_{2p}$, and $I_{1n}$ is substantially equal to $I_{2n}$.

Figures 3A, 3B:
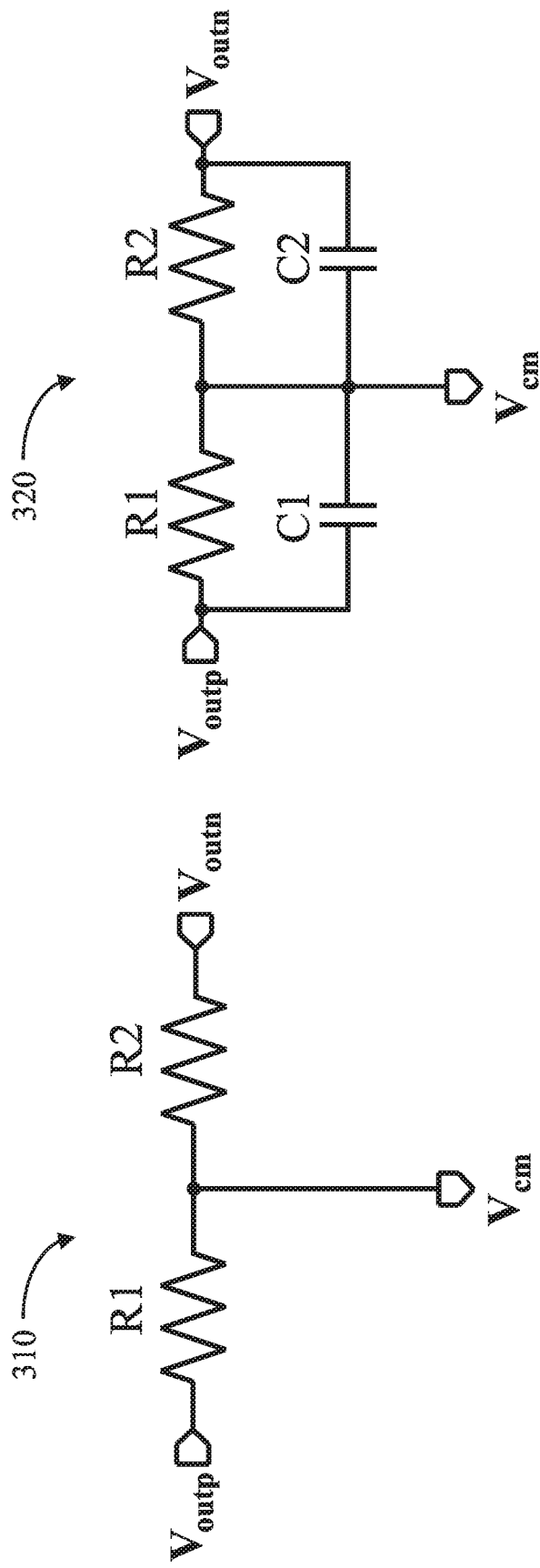
FIGS. 3A and 3B illustrate circuit diagrams of a common-mode voltage detection circuit according to two example embodiments of the present invention.

FIGS. 3A and 3B are circuit diagrams of the common-mode voltage detection circuit 230 according to two example embodiments of the present invention. The common-mode voltage detection circuit 310 includes a resistor R1 and a resistor R2, and the resistance values of the resistor R1 and the resistor R2 can be designed to be equal. The common-mode voltage detection circuit 320 includes a resistor R1, a resistor R2, a capacitor C1 and a capacitor C2. The resistance values of the resistors R1 and R2 can be designed to be equal, and the capacitor values of the capacitors C1 and C2 can be designed to be equal.

Figure 4:
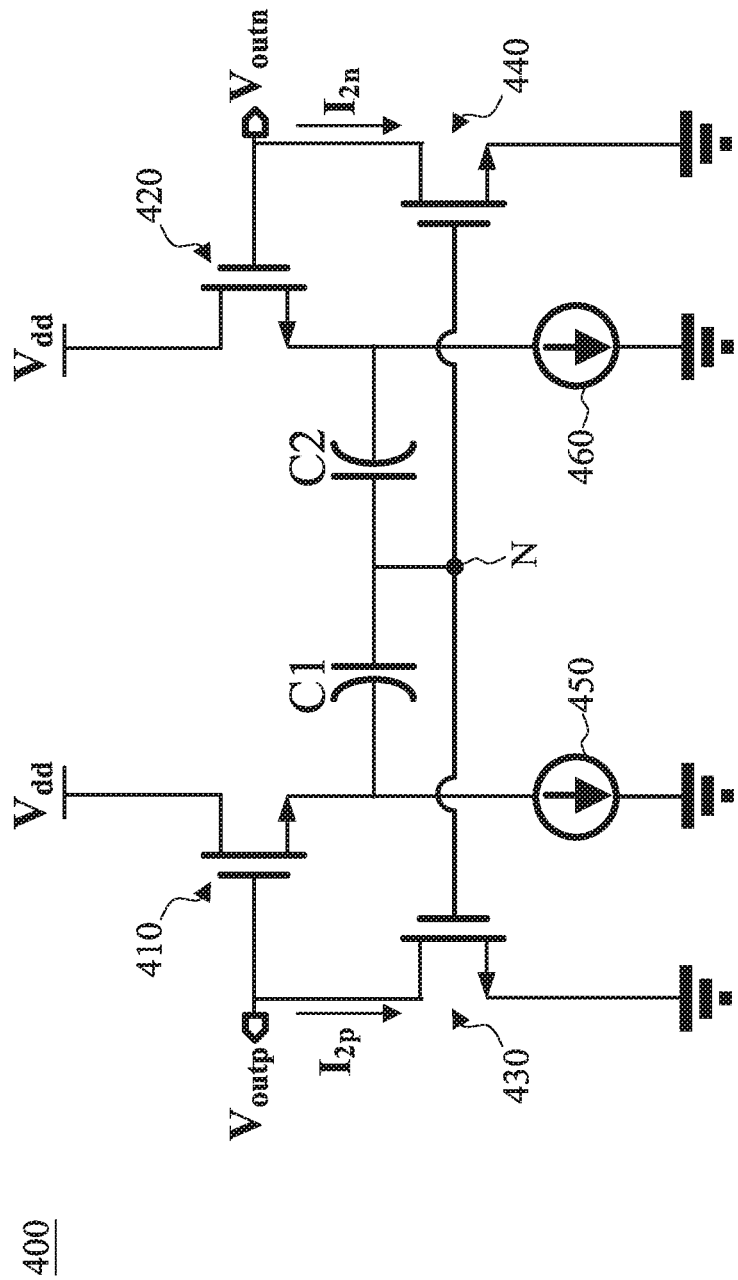
FIG. 4 illustrates a circuit diagram of a pull-down circuit according to an embodiment of the present invention.
Figure 5:
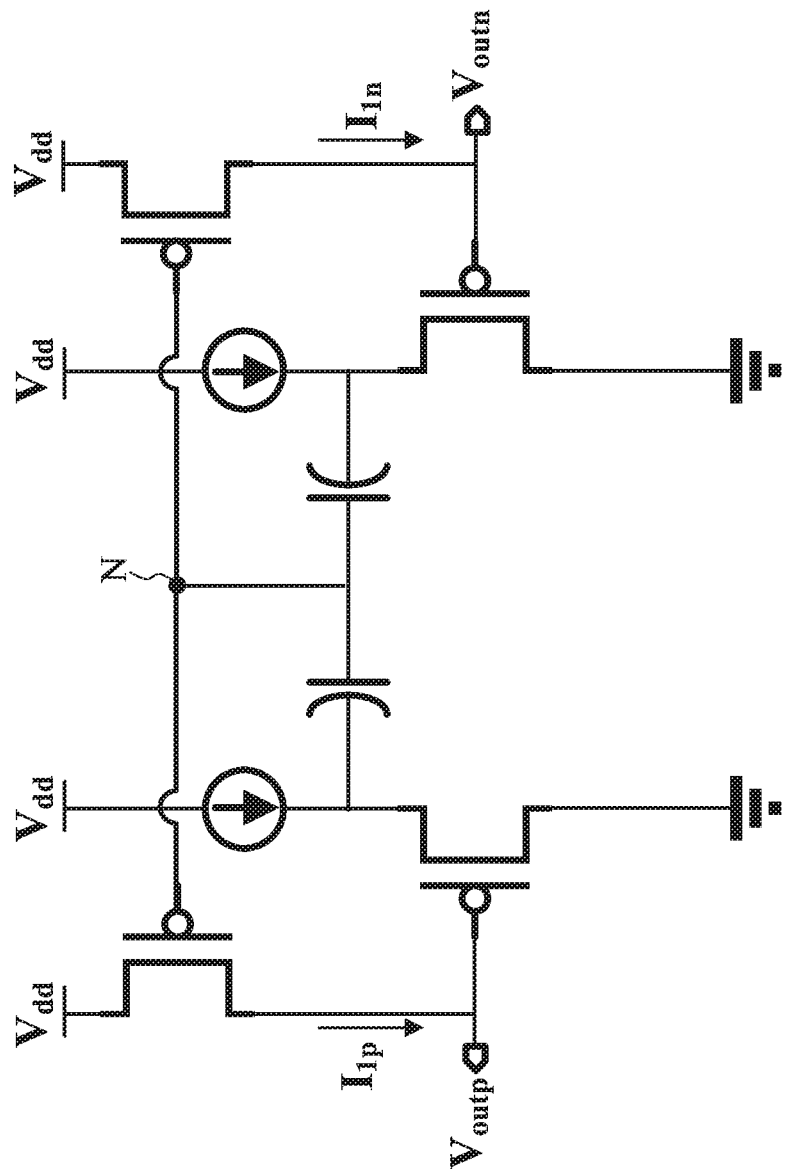
FIG. 5 illustrates a circuit diagram of a pull-up circuit according to an embodiment of the present invention.

FIG. 4 is a circuit diagram of a pull-down circuit according to an embodiment of the present invention. The pull-down circuit 400 is a transconductance circuit which includes a transistor 410, a transistor 420, a transistor 430, a transistor 440, a current source 450, a current source 460, a capacitor C1 and a capacitor C2. The pull-down circuit 400 is equivalent to a combination of the pull-down circuit 214 and the pull-down circuit 224. The current source 450 and the current source 460 are used for biasing the transistor 410 and the transistor 420, respectively. In other words, the functions of the current sources 450 and 460 are equivalent to the voltage $V_{bias\_PD}$. The capacitors C1 and C2 can be used for detecting the common-mode voltage $V_{cm}$ of the output signal $V_{outp}$ and the output signal $V_{outn}$, that is, the voltage change at the node N reflects the change in the common-mode voltage $V_{cm}$. In other words, when the pull-down circuit 214 and the pull-down circuit 224 in FIG. 2 are implemented by the pull-down circuit 400, the common-mode voltage detection circuit 230 is inherently integrated into the pull-down circuit 400. The transistor 430 and the transistor 440 adjust the current $I_{2p}$ and the current $I_{2n}$ according to the change in the common-mode voltage $V_{cm}$, so as to achieve the purpose of adjusting the common-mode voltage $V_{cm}$. FIG. 5 is a circuit diagram of the pull-up circuit according to an embodiment of the present invention. The pull-up circuit 500 has similar components to those of the pull-down circuit 400. People having ordinary skill in the art can understand the details of the circuit of FIG. 5 by referring to the descriptions of FIG. 4, and so the details are omitted for brevity.

For more implementations of the common-mode voltage control circuit, please refer to U.S. patent application Ser. No. 15/343,247.

The above-mentioned common-mode voltage control circuit 140 can stabilize the common-mode voltage of a node in a circuit of a transmitter, a receiver and a transceiver. Thus, the common-mode disturbances in transmitters, receivers and transceivers can be mitigated, thereby improving the circuit performance. By merely referring to the common-mode voltage of the controlled node (e.g., obtaining the common-mode voltage according to the differential signal on the controlled node), without the need to refer to the voltages of other nodes in the circuit, the common-mode voltage control circuit 140 dynamically and actively adjusts the common-mode voltage of the controlled node; thus, the common-mode voltage of the controlled node is stabilized. Through detecting and adjusting the common-mode voltage of at least one node in the circuit, the transmitter, receiver and transceiver provided by the present invention have the advantages of stable operation and excellent performance.

Compared with the conventional technology, the common-mode voltage of the transmitter, receiver and transceiver of the present invention is less susceptible to disturbance and appears relatively stable, and so the performance of the transmitter, receiver and transceiver is improved.

Since a person having ordinary skill in the art can appreciate the implementation detail and the modification thereto of the present method invention through the disclosure of the device invention, repeated and redundant description is thus omitted. Please note that the shape, size, and ratio of any element in the disclosed figures are exemplary for understanding, not for limiting the scope of this invention.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A transceiver, comprising:
    a hybrid transceiving circuit, including:
        a digital-to-analog converter circuit;
        a line driver coupled to the digital-to-analog converter circuit;
        a filtering and/or amplifying circuit coupled to the line driver; and
        an analog-to-digital converter circuit coupled to the filtering and/or amplifying circuit; and
    a common-mode voltage control circuit which is electrically coupled to a node of the hybrid transceiving circuit, is configured to detect a common-mode voltage of the node and to adjust the common-mode voltage of the node, and includes a pull-up circuit for sourcing a current to the node according to the common-mode voltage;
    wherein when the common-mode voltage decreases, the pull-up circuit increases the current, and when the common-mode voltage increases, the pull-up circuit decreases the current.

2. The transceiver of claim 1, wherein the common-mode voltage control circuit further comprises:
    a pull-down circuit for sinking a current from the node according to the common-mode voltage;
    wherein when the common-mode voltage decreases, the pull-down circuit decreases the current, and when the common-mode voltage increases, the pull-down circuit increases the current.

3. The transceiver of claim 1, wherein the node is an output terminal of the line driver.

4. The transceiver of claim 1, wherein the filtering and/or amplifying circuit comprises a filter and an amplifier coupled in series, and the node is an input terminal of the filter.

5. The transceiver of claim 1, wherein the filtering and/or amplifying circuit comprises a filter and an amplifier coupled in series, and the node is an output terminal of the filter and an input terminal of the amplifier.

6. The transceiver of claim 1, wherein the node is an input terminal of the analog-to-digital converter circuit.

7. The transceiver of claim 1, wherein the node is an output terminal of the digital-to-analog converter circuit.

8. A transmitter, comprising:
    a transmitting circuit, comprising:
        a digital-to-analog converter circuit;
        a line driver coupled to the digital-to-analog converter circuit; and
        a terminator coupled to the line driver; and
    a common-mode voltage control circuit which is electrically coupled to a node of the transmitting circuit, is configured to detect a common-mode voltage of the node and to adjust the common-mode voltage of the node, and includes a pull-up circuit for sourcing a current to the node according to the common-mode voltage;

wherein when the common-mode voltage decreases, the pull-up circuit increases the current, and when the common-mode voltage increases, the pull-up circuit decreases the current.

9. The transmitter of claim 8, wherein the common-mode voltage control circuit further comprises:

a pull-down circuit for sinking a current from the node according to the common-mode voltage;

wherein when the common-mode voltage decreases, the pull-down circuit decreases the current, and when the common-mode voltage increases, the pull-down circuit increases the current.

10. The transmitter of claim 8, wherein the node is an output terminal of the line driver.

11. The transmitter of claim 8, wherein the node is an output terminal of the digital-to-analog converter circuit.

12. The transmitter of claim 8, wherein the transmitter comprises an output terminal, and the node is electrically coupled to the terminator and the output terminal.

13. A receiver, comprising:

a receiving circuit, comprising:

a terminator;

a filtering and/or amplifying circuit coupled to the terminator; and an analog-to-digital converter circuit coupled to the filtering and/or amplifying circuit; and a common-mode voltage control circuit which is electrically coupled to a node of the receiving circuit, is configured to detect a common-mode voltage of the node and to adjust the common-mode voltage of the node, and includes a pull-up circuit for sourcing a current to the node according to the common-mode voltage;

wherein when the common-mode voltage decreases, the pull-up circuit increases the current, and when the common-mode voltage increases, the pull-up circuit decreases the current.

14. The receiver of claim 13, wherein the common-mode voltage control circuit further comprises:

a pull-down circuit for sinking a current from the node according to the common-mode voltage;

wherein when the common-mode voltage decreases, the pull-down circuit decreases the current, and when the common-mode voltage increases, the pull-down circuit increases the current.

15. The receiver of claim 13, wherein the filtering and/or amplifying circuit comprises a filter and an amplifier coupled in series, and the node is an input terminal of the filter.

16. The receiver of claim 13, wherein the filtering and/or amplifying circuit comprises a filter and an amplifier coupled in series, and the node is an output terminal of the filter and an input terminal of the amplifier.

17. The receiver of claim 13, wherein the node is an input terminal of the analog-to-digital converter circuit.

* * * * *